(12) United States Patent
Lim et al.

(10) Patent No.: US 9,877,264 B2
(45) Date of Patent: Jan. 23, 2018

(54) APPARATUS AND METHOD FOR REDUCING TRANSMISSION DELAY OF HTTP PROTOCOL AND PROCESSING LOAD OF HTTP SERVER IN WIRELESS COMMUNICATIONS NETWORK

(71) Applicants: Samsung Electronics Co., Ltd., Gyeonggi-do (KR); University-Industry Cooperation Group of Kyung hee University, Gyeonggi-do (KR)

(72) Inventors: Hanna Lim, Seoul (KR); Sungwon Lee, Gyeonggi-do (KR); Jicheol Lee, Gyeonggi-do (KR); Hyungho Lee, Seoul (KR)

(73) Assignees: Samsung Electronics Co., Ltd (KR); University-Industry Cooperation Group of Kyung Hee University (KR)

( * ) Notice: Subject to any disclaimer, the term of this patent is extended or adjusted under 35 U.S.C. 154(b) by 373 days.

(21) Appl. No.: 14/161,115

(22) Filed: Jan. 22, 2014

(65) Prior Publication Data
US 2014/0207960 A1    Jul. 24, 2014

(30) Foreign Application Priority Data

Jan. 22, 2013 (KR) .................. 10-2013-0006959

(51) Int. Cl.
*G06F 15/16* (2006.01)
*H04W 40/24* (2009.01)
(Continued)

(52) U.S. Cl.
CPC ............. *H04W 40/24* (2013.01); *H04L 45/74* (2013.01); *H04L 67/02* (2013.01); *H04L 67/143* (2013.01);
(Continued)

(58) Field of Classification Search
None
See application file for complete search history.

(56) References Cited

U.S. PATENT DOCUMENTS 6,857,009 B1 * 2/2005 Ferreria ................ H04L 69/163
370/401
6,877,036 B1 * 4/2005 Smith ..................... H04L 69/16
709/202

(Continued)

*Primary Examiner* — Viet Vu
*Assistant Examiner* — James Edwards
(74) *Attorney, Agent, or Firm* — The Farrell Law Firm, P.C.

(57) ABSTRACT

A method and apparatus for managing and controlling wireless connection of a HyperText Transfer Protocol (HTTP) proxy device in a wireless communication network are provided. The method includes receiving one of information indicating a wireless connection deactivation of an HTTP client performing HTTP communication and information indicating a change in an Internet Protocol (IP) address of the HTTP client from a predetermined node of the wireless communication network; and deactivating a connection with an HTTP server if the received information indicates the wireless connection deactivation of an HTTP client performing the HTTP communication; and maintaining a connection with an HTTP server if the received information indicates the change in the Internet Protocol (IP) address of the HTTP client.

18 Claims, 20 Drawing Sheets

(51) Int. Cl.
*H04L 29/06* (2006.01)
*H04L 12/741* (2013.01)
*H04L 29/08* (2006.01)

(52) U.S. Cl.
CPC ............ *H04L 67/145* (2013.01); *H04L 67/26* (2013.01); *H04L 69/16* (2013.01); *H04L 67/2823* (2013.01)

(56) References Cited

U.S. PATENT DOCUMENTS

| | | |
|---|---|---|
| 8,213,915 B1 | 7/2012 | Upadhyay et al. |
| 2002/0104022 A1* | 8/2002 | Jorgenson ............... H04L 29/06 726/12 |
| 2003/0218996 A1* | 11/2003 | Sumino ................... H04L 45/28 370/328 |
| 2009/0138586 A1* | 5/2009 | Maschio-Esposito ............ H04L 41/0896 709/223 |
| 2009/0196265 A1* | 8/2009 | Mariblanca Nieves ................. H04W 8/065 370/338 |
| 2010/0138869 A1* | 6/2010 | Li .......................... H04H 60/39 725/54 |
| 2010/0210240 A1* | 8/2010 | Mahaffey ............ H04L 41/0253 455/411 |
| 2011/0075675 A1* | 3/2011 | Koodli .................... H04L 12/14 370/401 |
| 2011/0119357 A1* | 5/2011 | Lindholm ......... H04L 29/12273 709/220 |
| 2011/0137973 A1* | 6/2011 | Wei ..................... H04L 67/1008 709/202 |
| 2011/0219135 A1* | 9/2011 | Minamizawa .......... H04L 51/12 709/230 |
| 2012/0117253 A1* | 5/2012 | Scoda ................. H04L 67/2814 709/228 |
| 2013/0067026 A1* | 3/2013 | Hershko ................ H04L 61/106 709/217 |
| 2013/0111053 A1* | 5/2013 | Perreault ............. H04L 67/231 709/231 |
| 2013/0304916 A1* | 11/2013 | Hodapp ................. H04N 21/20 709/224 |
| 2014/0317234 A1* | 10/2014 | Mueller ................. H04L 47/10 709/217 |

* cited by examiner

FIG. 6

| Client IP# | Client TCP# | Client HSEQ# | Server IP# | Server TCP# | Server HSEQ# | Status |
|---|---|---|---|---|---|---|
| 610 | 620 | 630 | 640 | 650 | 660 | 670 |
|  |  |  |  |  |  |  |

FIG. 10

| UE ID# | Client IP# | Client TCP# | Client HSEQ# | Server IP# | Server TCP# | Server HSEQ# | Status |
|---|---|---|---|---|---|---|---|
| | | | | | | | |

| UE ID# | Client IP# | Client TCP# | Client HSEQ# | Server IP# | Server TCP# | Server HSEQ# | Status |
|---|---|---|---|---|---|---|---|
| 0x1004 | 0 | B | 1 | 3 | x | 10 | Closed |

(B)

| UE ID# | Client IP# | Client TCP# | Client HSEQ# | Server IP# | Server TCP# | Server HSEQ# | Status |
|---|---|---|---|---|---|---|---|
| 0x1004 | 9 | C | 1 | 3 | x | 10 | Closed |

| UE ID# | Client IP# | Client TCP# | Client HSEQ# | Server IP# | Server TCP# | Server HSEQ# | Status |
|---|---|---|---|---|---|---|---|
| 0x1004 | 0 | B | 1 | 3 | x | 10 | Wait4Res |

B

| UE ID# | Client IP# | Client TCP# | Client HSEQ# | Server IP# | Server TCP# | Server HSEQ# | Status |
|---|---|---|---|---|---|---|---|
| 0x1004 | 9 | - | 1 | 3 | x | 10 | Wait4Res |

C

| UE ID# | Client IP# | Client TCP# | Client HSEQ# | Server IP# | Server TCP# | Server HSEQ# | Status |
|---|---|---|---|---|---|---|---|
| 0x1004 | 9 | C | 1 | 3 | x | 10 | ResQueued |

D

| UE ID# | Client IP# | Client TCP# | Client HSEQ# | Server IP# | Server TCP# | Server HSEQ# | Status |
|---|---|---|---|---|---|---|---|
| 0x1004 | 9 | C | 1 | 3 | x | 10 | Closed |

| UE ID# | Client IP# | Client TCP# | Client HSEQ# | Server IP# | Server TCP# | Server HSEQ# | Status |
|---|---|---|---|---|---|---|---|
| 0x1004 | 0 | B | 1 | 3 | x | 10 | ResQueued |

B:

| UE ID# | Client IP# | Client TCP# | Client HSEQ# | Server IP# | Server TCP# | Server HSEQ# | Status |
|---|---|---|---|---|---|---|---|
| 0x1004 | 9 | C | 1 | 3 | x | 10 | Closed |

| UE ID# | Client IP# | Client TCP# | Client HSEQ# | Server IP# | Server TCP# | Server HSEQ# | Status |
|---|---|---|---|---|---|---|---|
| 0x1004 | 0 | B | 1 | 3 | x | 90 | Closed |

B

| UE ID# | Client IP# | Client TCP# | Client HSEQ# | Server IP# | Server TCP# | Server HSEQ# | Status |
|---|---|---|---|---|---|---|---|
| 0x1004 | N/A | N/A | N/A | 3 | x | 90 | PushEnable |

C

| UE ID# | Client IP# | Client TCP# | Client HSEQ# | Server IP# | Server TCP# | Server HSEQ# | Status |
|---|---|---|---|---|---|---|---|
| 0x1004 | N/A | N/A | 1 | 3 | x | 90 | Wait4Res |

D

| UE ID# | Client IP# | Client TCP# | Client HSEQ# | Server IP# | Server TCP# | Server HSEQ# | Status |
|---|---|---|---|---|---|---|---|
| 0x1004 | 9 | C | 1 | 3 | x | 90 | Closed | ns. APPARATUS AND METHOD FOR
REDUCING TRANSMISSION DELAY OF
HTTP PROTOCOL AND PROCESSING LOAD
OF HTTP SERVER IN WIRELESS
COMMUNICATIONS NETWORK

PRIORITY

This application claims priority under 35 U.S.C. §119(a) to Korean Patent Application No. 10-2013-0006959, which was filed in the Korean Intellectual Property Office on Jan. 22, 2013, the entire content of which is incorporated herein by reference.

BACKGROUND OF THE INVENTION

1. Field of the Invention

The present invention relates generally to a wireless communications network, and more particularly, to an apparatus and a method for reducing a transmission delay through use of HyperText Transfer Protocol (HTTP) and a processing load of an HTTP server, in a wireless communications network.

2. Description of the Related Art

Wireless communication systems have been developed to provide voice services to users, and have expanded to additionally provide data services. In recent years, wireless communication systems have been further developed in order to provide high-speed data services. However, due resource shortages and user demands for providing a higher speed services, a more-advanced wireless communication system is required.

FIG. 1 illustrates a network structure of a wireless communication technology.

FIG. 1 is a diagram illustrating a communication system in which an Internal Protocol (IP) communication message is transmitted from a mobile communication User Equipment (UE) to a mobile communication that which terminates an IP communication of a corresponding UE.

FIG. 1, depicts as communication network according to a Long Term Evolution (LTE) scheme, which is a 4th Generation communications network, and therefore, a Packet Data Network (PDN) Gateway (PGW) is used in the network. With respect to FIG. 1, all IP message exchanges performed between a UE 110 and other communication devices using an internet connection are performed through a corresponding PGW 120. Thus, when client software based on a HyperText Transfer Protocol (HTTP) is used, all messages of the corresponding HTTP-based services are processed via the PGW 120.

An HTTP proxy device 130 is used between the PGW 120 and an HTTP server 140, thereby substantially providing an HTTP service in order to provide an HTTP service having a more advanced performance than performance provided by the mobile communications network. The HTTP proxy device 130 improves user satisfaction with respect to the HTTP service by generally providing an improvement in transmission speeds by compressing HTTP traffic, security reinforcement by protecting an HTTP user or an HTTP server from illegal or malicious attacks, and caching, which includes storing frequently-accessed contents of the HTTP server and rapidly transferring the stored contents to the HTTP user.

FIG. 2 is a diagram illustrating an internal configuration of a conventional HTTP proxy device.

Referring to FIG. 2, in the HTTP proxy device 130, HTTP clients are connected to one side thereof, and an HTTP server is connected to another side thereof. Since the HTTP proxy device 130 terminates 4-layered communication (e.g. opposite Transmission Control Protocols (TCPs)), a function of matching a left side of FIG. 2 (i.e., communications with respect to the router 210) and a right side of FIG. 2 (i.e., communications with respect to the HTTP server 140) is needed.

To this end, the HTTP proxy device 130 includes a router traffic handler 220 for directing the router 210 to which the HTTP clients are connected, and a server traffic handler 260 for directing the HTTP server 140. The HTTP proxy device 130 further includes an HTTP bearer processor 230 for performing the matching operation. The HTTP bearer processor 230 stores, in an HTTP session database 250, information regarding a 4-layered connection with the HTTP clients 110 and information regarding a 4-layered connection with the HTTP server 140, in order to correctly match the HTTP clients 110 and the HTTP server 140. An HTTP session manager 240, which directs the HTTP bearer processor 230 to match sessions of the HTTP client 110 and the HTTP server 140, operates based on the corresponding information.

Thus, the HTTP session manager 240 performs control operations, such that the HTTP bearer processor 230 correctly matches the sessions of the HTTP client 110 and the HTTP server 140, based on the information of the HTTP session database 250.

Several examples problems of the above-mentioned communication systems are described below.

First, when the HTTP client 110 transmits a plurality of HTTP request messages to the HTTP server 140 through one Transmission Control Protocol (TCP) connection, the HTTP server 140 must transmit HTTP response messages, which are responses to the HTTP request messages, to the HTTP client 110 in the same sequence as the HTTP request messages. However, when generation or transmission of one of the HTTP responses is delayed, transmission of all the following HTTP responses to the HTTP client may be delayed.

Second, one TCP session is maintained for a long time in order to connect the HTTP client 110 and the HTTP server 140 to each other once and then to reconnect the HTTP client 110 and the HTTP server 140 to each other, such as in a Persistent HTTP mode originally defined in the HTTP standard or an SPeeDY (SPDY) recently proposed as an improved alternative. At this time, when the HTTP client 110 is not normally performing TCP connection deactivation with the HTTP server 140, the HTTP client 110 must remove the corresponding TCP session by itself. In this situation, when a TCP connection between the HTTP client 110 and the HTTP server 140 is abnormally terminated due to instability of wireless connection of a UE in the mobile communications network, or when an IP address is changed by performing a handover through moving the UE, the existing TCP connection is abnormally operated, and therefore, it is difficult for the HTTP server 140 to identify the abnormal operation. Even when a user performs cyclic message transmission/reception to/from the HTTP server 140 and the HTTP client 110 to detect abnormal termination, in order to identify movement of the corresponding UE, wireless traffic is wasted. Further, when the TCP connection, in which the HTTP server 140 is abnormally terminated, is maintained for a predetermined time period, an additional processing load of the server is unnecessarily generated.

Third, when one TCP session is maintained for a long time, in order to rapidly reconnect the HTTP client 110 and the HTTP server 140 to each other, such as with Persistent HTTP or SPDY described with respect to second problem above, the corresponding HTTP client 110 is a mobile communication UE, and therefore, when the IP address is changed due to a handover in wireless communication, the HTTP server 140 cannot identify the changed IP address. Therefore, when the base station is changed due to movement of the UE in the mobile communications network, the UE may not use the currently-used IP address and may change the IP address thereof. For example, when an Access Point (AP) is changed in a Wireless Local Area Network (WLAN) or a PGW is changed in a Long Term Evolution (LTE) network, when the IP address of the corresponding UE is changed, the TCP connection between the HTTP server 140 and the HTTP client 110 is abnormally terminated, such that the second problem is generated, and therefore, the IP address allocated to the corresponding UE becomes useless. Further, the communication service that was previously being performed is abnormally terminated due to deactivation of a TCP connection with the UE.

Fourth, in the current art, when one TCP session is maintained for a long time, such that the HTTP server 140 transmits a push message to the HTTP client 110, such as when using Persistent HTTP or SPDY as described with respect to the second and third problems herein above, the UE must consistently maintain the IP and the TCP sessions with respect to the HTTP server 140. In this situation, when there is no information to be transmitted or received by the UE in the mobile communications network, a wireless connection is deactivated and an IP is returned, or when monitoring traffic of the corresponding UE indicates that there is no information to be transmitted or received in the mobile communications network, an IP connection is deactivated. However, when the IP of the UE is deactivated, such as in the above-mentioned case, it is impossible for the HTTP server 140 to perform the HTTP push to the corresponding UE. In order to address above-mentioned problem, the connection may be maintained by cyclically transmitting a message to the UE. However, since a wireless data communication connection of the UE must be maintained in order to maintain the connection, communication costs of the UE and battery usage increase. Further, since the IP is consistently allocated to the corresponding UE, even in the mobile communications network, processing and a memory load for maintaining the corresponding IP session are generated.

SUMMARY OF THE INVENTION

An aspect of the present invention is to address the above-mentioned problems and to provide at least the advantages described below. Another aspect of the present invention is to improve HTTP, which is a core communication protocol used for providing an internet service.

According to an aspect of the present invention, a method of managing and controlling wireless connection of a Hyper-Text Transfer Protocol (HTTP) proxy device in a wireless communication network is provided. The method includes receiving one of information indicating a wireless connection deactivation of an HTTP client performing HTTP communication and information indicating a change in an Internet Protocol (IP) address of the HTTP client from a predetermined node of the wireless communication network; and deactivating a connection with an HTTP server if the received information indicates the wireless connection deactivation of an HTTP client performing the HTTP communication; and maintaining a connection with an HTTP server if the received information indicates the change in the Internet Protocol (IP) address of the HTTP client.

According to another aspect of the present invention, an HTTP proxy device for managing and controlling wireless connection in a wireless communication network is provided. The HTTP proxy device includes an interface unit that performs communication with a predetermined node located at the wireless communication network; and a controller that performs a control to receive one of information indicating wireless connection deactivation of an HTTP client performing HTTP communication and information indicating a change in an Internet Protocol (IP) address of the HTTP client from the predetermined node and to deactivate a connection with an HTTP server if the received information indicates the wireless connection deactivation of an HTTP client performing the HTTP communication, and maintains a connection with an HTTP server if the received information indicates the change in the Internet Protocol (IP) address of the HTTP client.

BRIEF DESCRIPTION OF THE DRAWINGS

The above and other aspects, features, and advantages of the present invention will be more apparent from the following detailed description taken in conjunction with the accompanying drawings, in which:

FIG. 6 is a diagram illustrating a database structure applied to each message according to an embodiment of the present invention;

FIG. 10 is a diagram illustrating an expanded structure of the database of FIG. 6 according to an embodiment of the present invention;

FIG. 12 is a diagram illustrating an example of a session database of an HTTP proxy 1130 with respect to the operation scenario of FIG. 11 according to an embodiment of the present invention;

FIG. 16 is a diagram illustrating an example of management of a session database of an HTTP proxy 1130 with respect to the operation scenario of FIG. 15 according to an embodiment of the present invention;

FIG. 18 is a diagram illustrating an example of managing a session database of an HTTP proxy 1130 with respect to the operation scenario of FIG. 17 according to an embodiment of the present invention;

FIG. 20 is a diagram illustrating an example of management of a session database of an HTTP proxy with respect to the operation scenario of FIG. 19 according to an embodiment of the present invention.

DETAILED DESCRIPTION OF EMBODIMENTS OF THE PRESENT INVENTION

Figure 1:
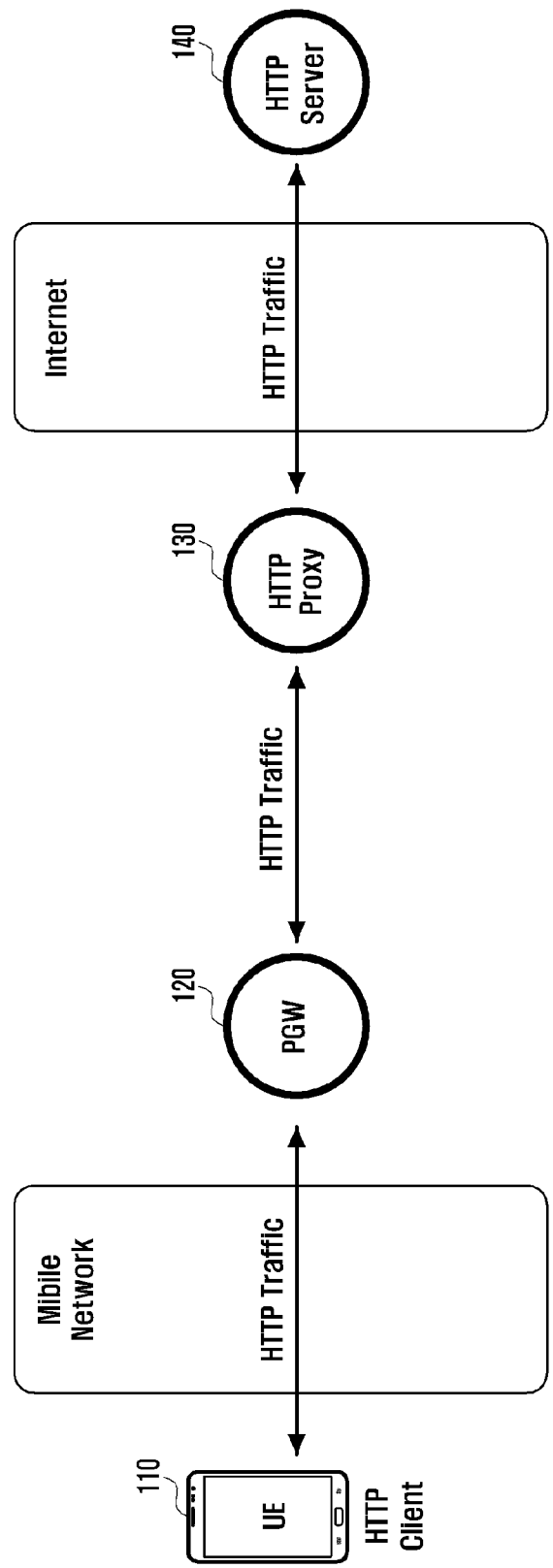
FIG. 1 is a diagram illustrating a network structure of a wireless communication technology.

Hereinafter, embodiments of the present invention will be described in detail with reference to the accompanying drawings. The same components or similar in the accompanying drawings may be designated by the same or similar reference numerals. A detailed description of well-known functions and configurations incorporated may be omitted herein when such a description may obscure the subject matter of the present invention.

The following description of embodiments of the present invention primarily refer to a Long Term Evolution (LTE) system. However, embodiments of the present invention are not limited to the LTE system, and embodiments of the present invention may be applied to other communication systems without departing from the scope of the present invention.

For example, functions that an Envolved Node B (eNB), which is a base station entity in the LTE system of the present invention, a PGW and an MME, which are entities on a core network, etc. perform according to an embodiment of the present invention may be performed by predetermined entities for other communication systems.

Although the following description refers to a wireless and mobile communications networks, embodiments of the present invention may be also applied to wired communications networks.

Another aspect of the present invention is to provide a method and an apparatus for providing a faster response time to a user of a service made based on the HTTP and providing a more improved service than the conventional service while a low load of a Central Processing Unit (CPU)/Memory of a server for providing an HTTP service is used, through an improved HTTP protocol. Further, the present invention allows a user to consistently receive the HTTP service even when wireless communication of a wireless UE is disconnected in a case where the HTTP protocol is used in a wireless communications network.

To this end, the present invention improves a function of an HTTP proxy device used for improving a performance of the existing HTTP protocol. To this end, the present invention changes the HTTP protocol. In addition, the HTTP server, the HTTP client, etc. are changed according to a change of the HTTP protocol. In addition, a function of the existing mobile communication device is improved in order to improve a performance of the HTTP specialized to the mobile communication.

The following four technologies will be proposed with respect to the solutions of the present invention for solving the above-mentioned problems.

As a first proposal technology for solving the first problem, an HTTP sequence number (or an HTTP transaction identifier) is included in an HTTP request (message) and an HTTP response (message) as a new field. To this end, an HTTP client records a number for identifying the corresponding message when transmitting the HTTP request, at an HTTP sequence field, and transmits the number to the HTTP server. The HTTP server lets the HTTP response include the HTTP sequence number of the HTTP request corresponding to the HTTP response when generating the HTTP response. The HTTP server transmits the HTTP responses to the HTTP client regardless of a sequence of the received HTTP requests. The HTTP client receives the HTTP responses received from the HTTP server in the order of arrival, regardless of a sequence of the transmitted HTTP requests.

As a proposal technology for solving the second problem, an HTTP proxy of a mobile communication network detects IP connection termination of a UE in conjunction with a device (e.g. a PGW of an LTE) which assigns an IP address to the UE, and informs the HTTP server of the detected result. To this end, it is assumed that the UE of the mobile communications network is connected to the HTTP proxy as default to perform communication with the HTTP server. The HTTP proxy maintains connection with the device which allocates an IP address of the mobile communication UE to identify whether IP connection of the UE is deactivated or not. When the HTTP communication is impossible due to normal/abnormal IP deactivation of the UE, the HTTP proxy instead of the UE performs connection deactivation of the HTTP server connected to the corresponding UE with the corresponding HTTP client.

As a proposal technology for solving the third problem, the HTTP proxy existing in the mobile communication network detects a change in an IP address of a UE in conjunction with a device which assigns an IP address to the mobile communication terminal and informs the HTTP server of the detected result. To this end, it is assumed that the UE of the mobile communications network is connected to the HTTP proxy as default to perform communication with the HTTP server. The HTTP proxy maintains connection with the device which allocates an IP address of the mobile communication UE, to identify whether an IP address of the UE is changed or not. When the IP address of the UE is changed, the HTTP proxy ensures that the corresponding change in the IP address influences only a signal exchange between the HTTP client and the HTTP proxy and does not influence a signal exchange between the HTTP proxy and the HTTP server, so that influence on the change in the IP address is not generated between the HTTP client and the HTTP server.

As a proposal technology for solving the fourth problem, the HTTP client or the HTTP server which wants the HTTP push transmits/receives an intention indicating "consistently wanting the HTTP" at a time point of setting the HTTP connection. The HTTP proxy identifies the intention, so that even when IP connection of the UE is deactivated after this time point, a push by the HTTP proxy is supported. Even after the IP address of the HTTP client is deactivated together with the wireless connection with the HTTP client, the HTTP proxy maintains session information for the corresponding HTTP client. A time period for maintaining the session information is permanent or a time value previously defined by the HTTP client or the HTTP server at a time of the HTTP connection. After IP deactivation of the HTTP client, when an HTTP message is transmitted from the HTTP server to the UE, a normal HTTP push message is transmitted to the HTTP proxy, and the HTTP proxy transmit the corresponding HTTP push message to the HTTP client. Thus, the wireless connection is deactivated so that the HTTP push for the UE not having an IP address is clearly transmitted to the HTTP server. An operation after the UE receives the HTTP push is performed according to technologies related to wireless paging among other existing technologies so that the operation is not related to the present invention. Thus, a detailed description of the operation will be omitted.

Figure 3:
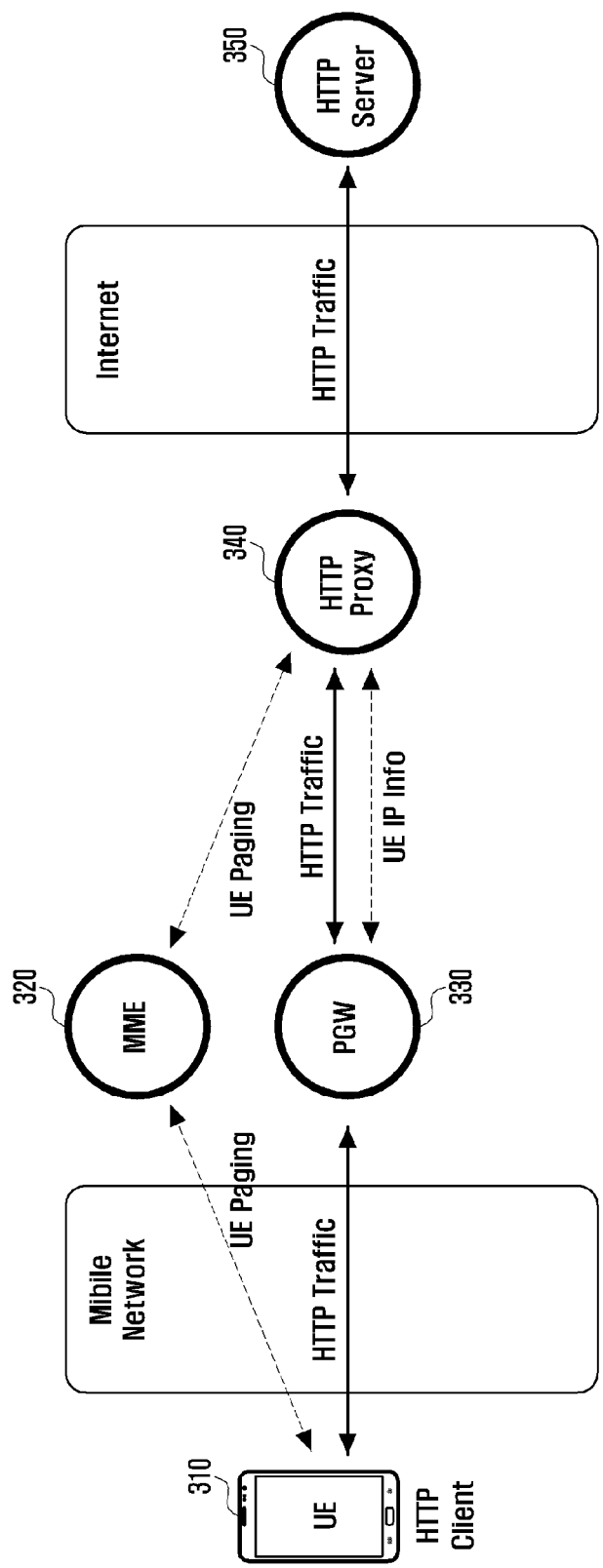
FIG. 3 is a diagram illustrating a network structure for supporting the present invention according to an embodiment of the present invention.

FIG. 3 is a diagram illustrating a network structure for supporting the present invention according to an embodiment of the present invention.

Figure 2:
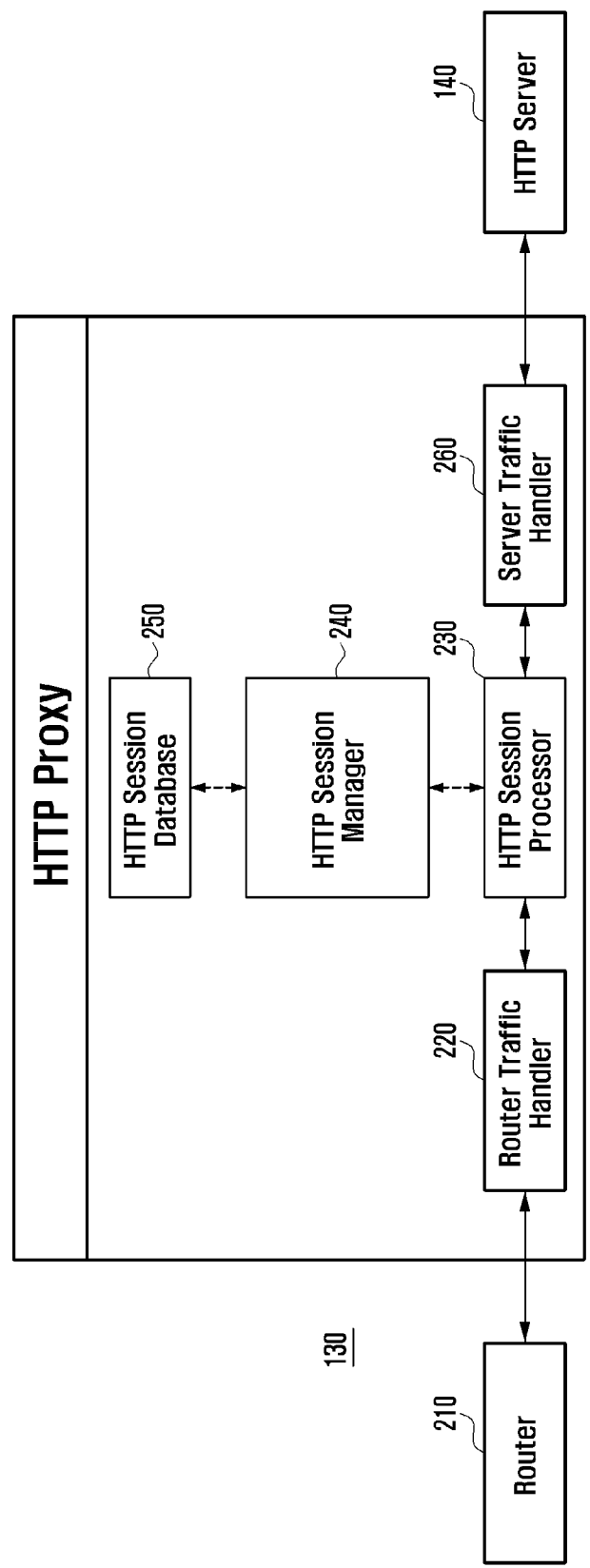
FIG. 2 is a diagram illustrating an internal structure of an HTTP proxy device according to the related art.

Referring to FIG. 3, an HTTP proxy device 340 according to an embodiment of the present invention includes a signaling interface (not shown) for transmitting/receiving IP protocol information of a user's UE to/from a PGW 330 of the mobile communications network that is different from the interface described herein with reference to FIGS. 1-2. The HTTP proxy device 340 also has a signaling interface (not shown) for transmitting/receiving a signal to/from a Mobility Management Entity (MME) device 320 that manages location information of a mobile communication UE and searches for the mobile communication UE through a paging operation.

Figure 4:
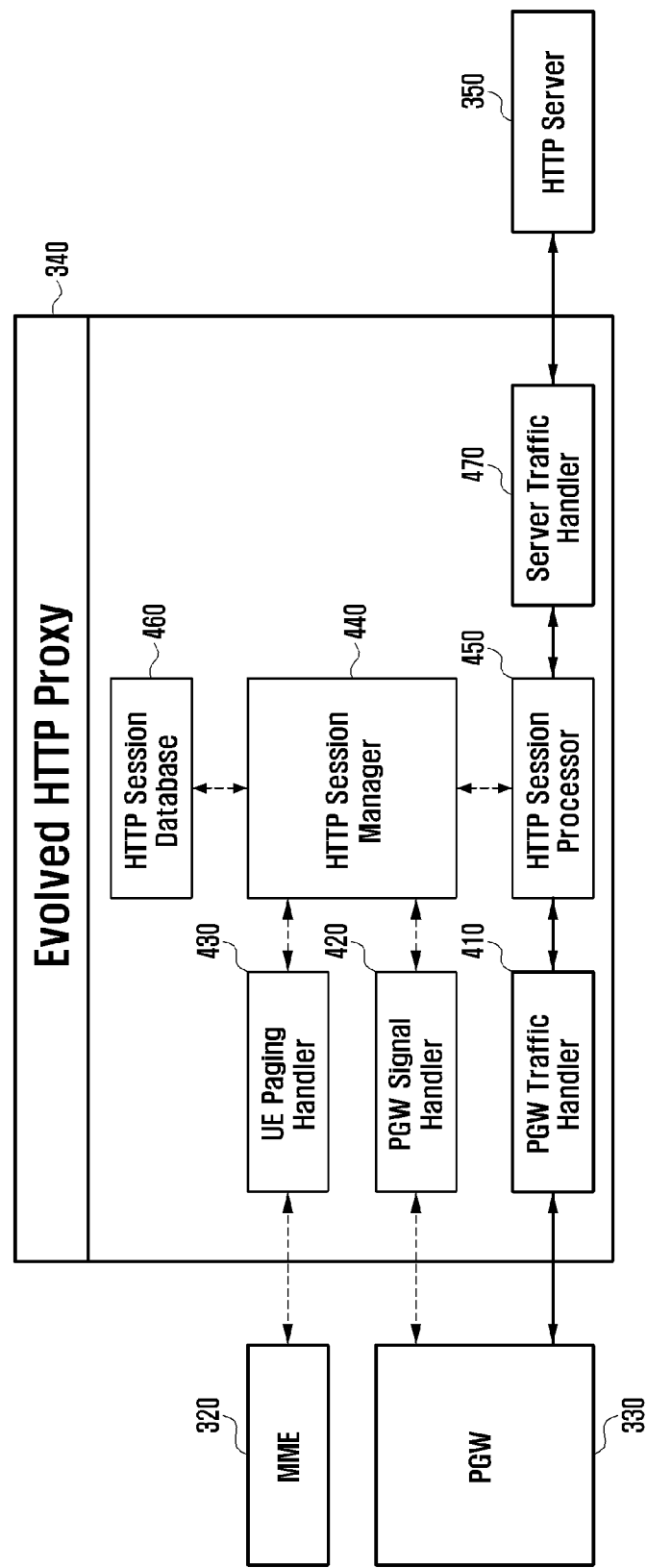
FIG. 4 is a diagram illustrating an internal structure of an HTTP proxy device 340 for supporting a technology according to an embodiment of the present invention.

FIG. 4 is a diagram illustrating an internal structure of an HTTP proxy device that supports a technology according to an embodiment of the present invention.

Referring to FIGS. 3 and 4, the HTTP proxy device 340 according to an embodiment of the present invention includes a PGW traffic handler 410. The PGW traffic handler 410 differs from a router traffic handler in that the PGW traffic handler 410 is used for objects for providing functions that are defined in the above-described third and fourth objects and are specialized to the mobile communication.

The HTTP proxy device 340 further includes a server traffic handler 470 for communicating with an HTTP server 350 is defined as an existing device.

The HTTP proxy device 340 for the present invention further includes a PGW signal handler 430 for transmitting/receiving IP protocol related information of a wireless UE that is managed by a PGW. For example, the PGW signal handler 430 supports the HTTP proxy to access information regarding a release or change of IP information of the UE. More specifically, the HTTP proxy 340 may transmit/receive information regarding wireless connection deactivation, IP address allocation, IP change, etc. of the HTTP client UE 310 to/from the PGW 330 through a corresponding device.

The evolved HTTP proxy device 340 further includes a UE paging handler 430 for paging processing for transmission of an HTTP push when the HTTP client UE 310 deactivates an IP connection. The evolved HTTP proxy device 340 further includes HTTP session manager 440 for, in addition to operations described with respect to the HTTP session manager 240 of FIG. 2, controlling/managing information of the wireless UE in order to match sessions of the HTTP client 310 and the HTTP server 350 in consideration of a change in IP protocol information of the mobile communication UE. Accordingly, the evolved HTTP proxy device 340 further includes an HTTP session processor 450 for processing HTTP traffic, and an HTTP session database 460 for controlling/managing additional information.

Meanwhile, an evolved HTTP proxy according to embodiments of the present invention are not limited to the various components is described above with respect to FIG. 4. For example, an HTTP proxy device according to an embodiment of the present invention may include an interface unit for performing communication with predetermined nodes of a wireless communications network, and a controller for performing other functions of the evolved HTTP proxy.

Figure 5:
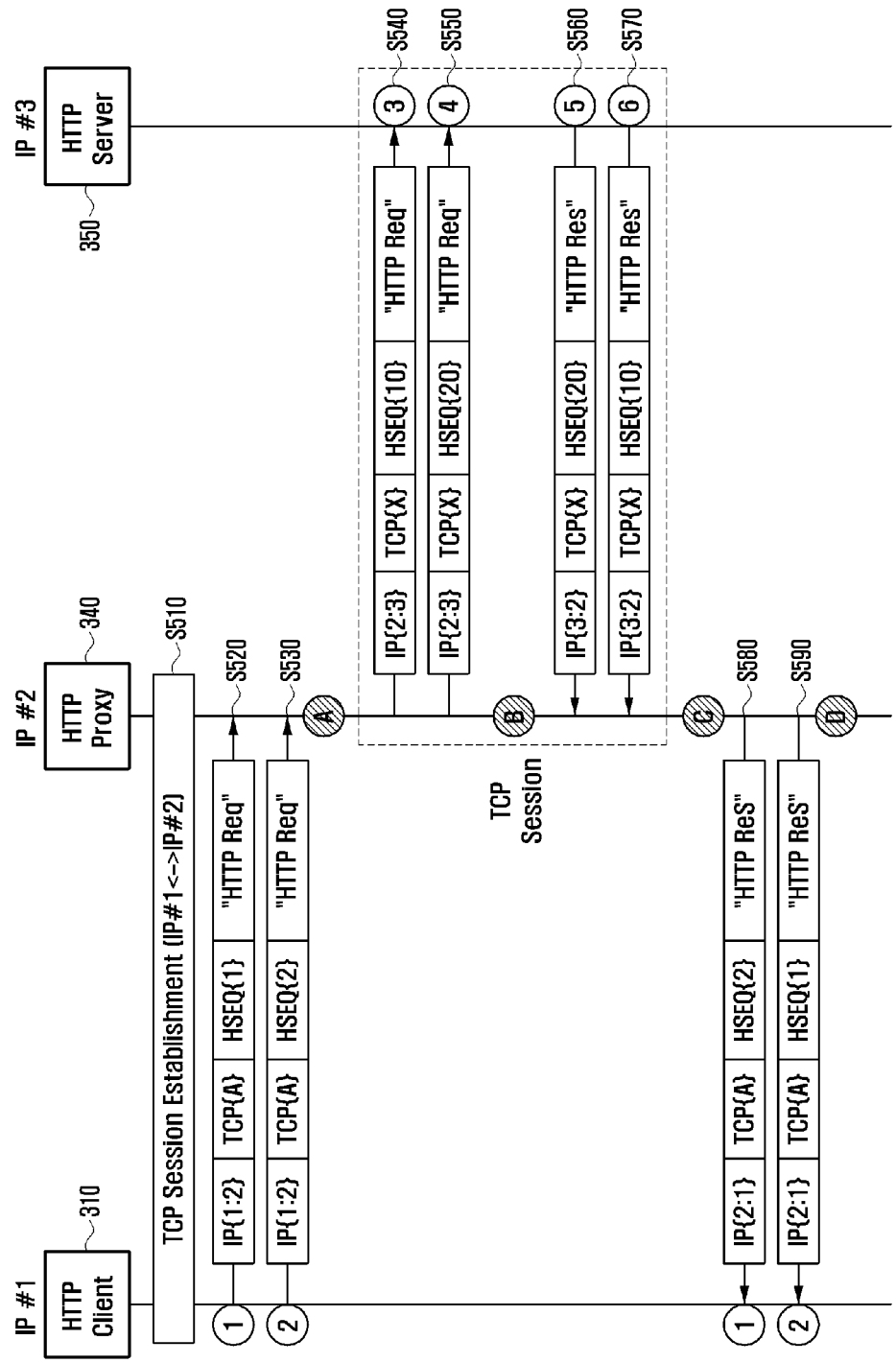
FIG. 5 is a signal flow diagram illustrating an operation process of asynchronous transmission of an HTTP message through a singular TCP session according to an embodiment of the present invention.

Hereinafter, embodiments of the present invention, including embodiments that specifically the four examples problems described in the Background of the Invention are described in detail. FIG. 5 is a signal flow diagram illustrating an example of an operation scenario of asynchronous transmission of an HTTP message through a singular TCP session according to an embodiment of the present invention.

Referring to FIG. 5, the HTTP client 310 has an IP address #1, the HTTP proxy 340 has an IP address #2, and the HTTP server 350 has an IP address #3.

In step S510, a TCP connection for a session of the HTTP client 310 is previously set between the HTTP client 310 and the HTTP proxy 340 and this TCP connection has a number #A. Meanwhile, the HTTP proxy 340 and the HTTP server 350 have a TCP number #X for the TCP connection of the HTTP client 310.

A message sequence according to an embodiment of the present invention is described below with reference to FIG. 5.

In step S520, when the HTTP client 310 transmits an HTTP request #1 (as indicated by HTTP sequence number #1, i.e., "HSEQ {1}") to the HTTP server 350, the HTTP proxy 340 initially receives the HTTP request #1. Next, in step S530, when the HTTP client 310 transmits an HTTP request #2 (as indicated by "HSEQ {2}") to the HTTP server 350, the HTTP proxy 340 also initially receives the HTTP request #2.

Thereafter, the HTTP proxy 340 determines an HTTP sequence number #10 as a new sequence number corresponding to the sequence number #1 of HTTP request #1 transmitted by the HTTP client 310, such that the HTTP proxy server 340 uses the new HTTP sequence number #10 while transmitting, in step S540 the HTTP transmission request of step S520 to the HTTP server 350. More specifically, in step S540, the HTTP proxy 340 transmits the HTTP request #10, into which the determined new HTTP sequence number #10 is inserted, to the HTTP server 350.

Next, the HTTP proxy 340 determines an HTTP sequence number #20 as a new sequence number corresponding to the sequence number #2 of HTTP request #2 transmitted by the HTTP client 310, such that the HTTP proxy server 340 uses the new HTTP sequence number #20 while transmitting, in step S550, the HTTP transmission request of step S530 to the HTTP server 350. More specifically, in step S550, the HTTP proxy 340 transmits the HTTP request #20, into which the determined new HTTP sequence number #20 is inserted, to the HTTP server 350.

Thereafter, in step S560, the HTTP proxy 340 receives, from the HTTP server 350, a response to the transmission of step S550 earlier than a response to the transmission of step S540, which is received in step S570.

Thereafter, in step S580, the HTTP proxy 340 transmits, in response to the transmission of step S560, the response to the transmission of step S550 to the HTTP client 310.

Next, in step S590, the HTTP proxy 340 transmits, in response to the transmission of step S570, the response to the transmission of step S540 to the HTTP client 310. The sequence of the transmissions of steps S580 and S590 is based upon the sequence of receipt of the responses from the HTTP server 350 in steps S560 and S570. As shown in FIG. 5, the HTTP sequence numbers used in steps S580 and S590 are restored to the same numbers used in steps S520 and S530.

FIG. 6 illustrates a database structure applied to each message according to an embodiment of the present invention.

In the above-described signal flow diagram of FIG. 5, the HTTP proxy 340 uses the database of FIG. 6 in order to match a left session of the HTTP client 310 (i.e., the session corresponding to the left side of FIG. 5) and a right session of the HTTP server 350 (i.e., the session corresponding to the right side of FIG. 5). The HTTP proxy 340 manages the database illustrated in FIG. 6 through the HTTP session database 460 of FIG. 4.

Hereinafter, each of the fields of the database of FIG. 6 are described in detail.

A client IP address 610 includes an IP address number of the HTTP client 310.

A client TCP number 620 includes a TCP port number that the HTTP client 310 uses in order to communicate with the HTTP proxy 340.

A client HTTP sequence number 630 includes an HTTP sequence number of an HTTP request that the HTTP client 310 transmits to the HTTP server 350 through the HTTP proxy 340.

A server IP address 640 includes an IP address number of the HTTP server 350.

A server TCP number 650 includes a TCP port number that the HTTP proxy 340 uses in order to communicate with the HTTP server 350.

A server HTTP sequence number 660 includes an HTTP sequence number of an HTTP request that the HTTP proxy 340 transmits to the HTTP server 350.

A status 670 indicates a status of processing an HTTP session. When the status of the HTTP proxy 340 is "ReqQueued", this status indicates that the HTTP client 310 has received the HTTP request. A status "Wait4Res" indicates that the HTTP request has been transmitted to the HTTP proxy 340. A status "ResQueued", indicates that the HTTP proxy 340 has received the HTTP response. A status corresponds to "Closed" indicates that the HTTP response is transmitted to the HTTP client 310 and then the HTTP session is terminated.

Figure 7:
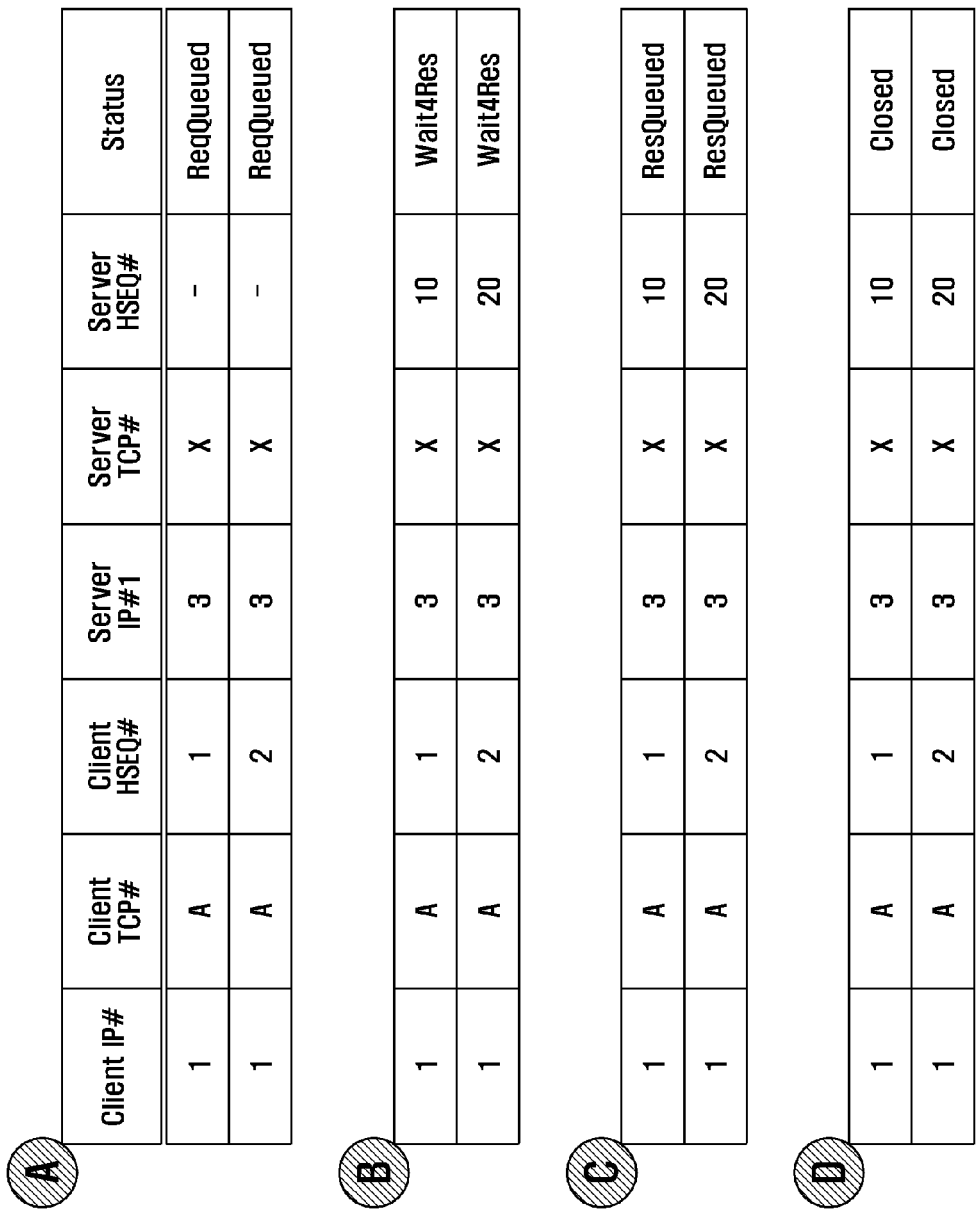
FIG. 7 is a diagram illustrating a management process of the database of FIG. 6 with respect to an operation scenario illustrated through the signal flow diagram of FIG. 5 according to an embodiment of the present invention.

FIG. 7 illustrates a management process of the database of FIG. 6 with respect to an operation scenario illustrated through the signal flow diagram of FIG. 5 according to an embodiment of the present invention.

More specifically, FIG. 7 illustrates a database management status of each of points A, B, C, and D of FIG. 5.

First, in step A, HTTP requests that have HTTP sequence numbers #1 and #2, respectively, arrive at the HTTP proxy 340 from the HTTP client 310 through the TCP #A via the IP address #3 of the HTTP server 350. The HTTP server 350 is connected to the current HTTP proxy 340 through the TCP #X.

However, since the corresponding message has not yet been transmitted from the HTTP proxy 340 to the HTTP server 350, the HTTP sequence to be used with respect to the HTTP server 350 has not yet been allocated.

In step B, the HTTP requests from step A are matched with corresponding HTTP sequence numbers #10 and #20, respectively, and then the matched HTTP requests are transmitted from the HTTP proxy 340 to the HTTP server 350.

Thereafter, when the HTTP proxy 340 receives HTTP responses from the HTTP server 350, the status of the corresponding session is changed to "ResQueued" and other information is not changed, in step C.

Thereafter, when the corresponding HTTP responses are transmitted to the HTTP client 310 with the HTTP sequence numbers #1 and #2, respectively, the status of the corresponding session is changed to "Closed" at the HTTP proxy 340, in step D.

Figure 8:
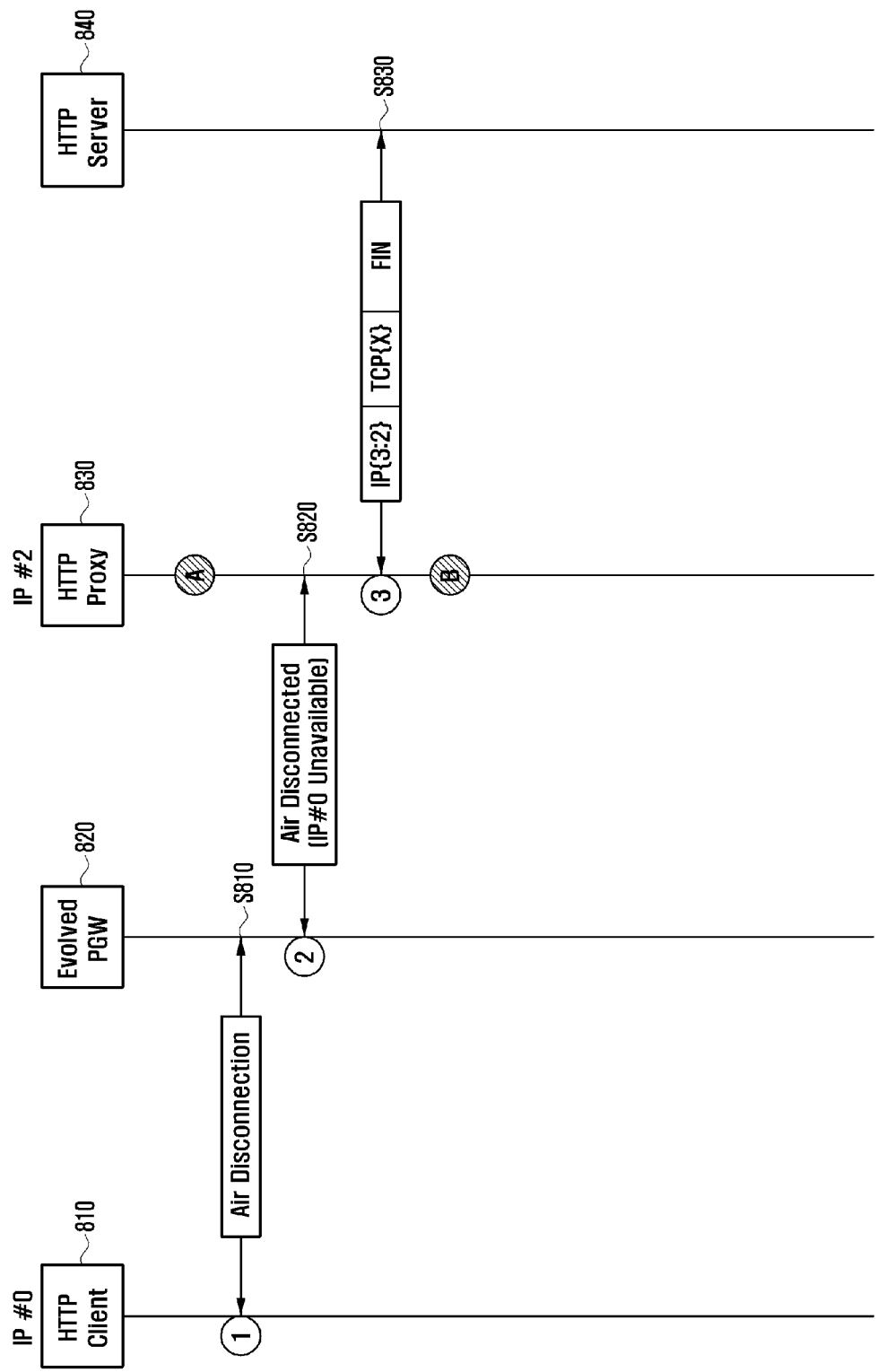
FIG. 8 is a signal flow diagram illustrating a TCP session deactivation operation scenario with respect to a UE, in which wireless communication is deactivated, to an HTTP server according to an embodiment of the present invention.

FIG. 8 is a signal flow diagram illustrating a TCP session deactivation operation scenario with respect to a UE, in which wireless communication is deactivated, to an HTTP server according to an embodiment of the present invention.

Referring to FIG. 8, first, in step S810, a PGW 820, which is a device that allocates a mobile communication IP, receives information indicating that wireless communication is normally or abnormally deactivated in a UE driven by driving an HTTP client 810.

In FIG. 8, the PGW may also be referred to as an evolved PGW.

Thereafter, since IP#0, which has been used by the UE driven by the HTTP client, is no longer allocated to the corresponding UE and is retrieved, the PGW 820 informs the HTTP proxy 830 of this de-allocation and retrieval, in step S820.

The HTTP proxy 830 internally records information indicating that an IP of the UE driven by the HTTP client 810 is no longer available. In step S830, the HTTP proxy 830 deactivates the TCP connection with the HTTP server 840 used by the corresponding HTTP client 810.

Referring back to FIG. 6, the types of statuses illustrated in FIG. 6 may further include "AirClosed" (not shown). The "AirClosed" status is defined as a status in which IP of the HTTP Client is deactivated and TCP with the HTTP server is also deactivated.

Figure 9:
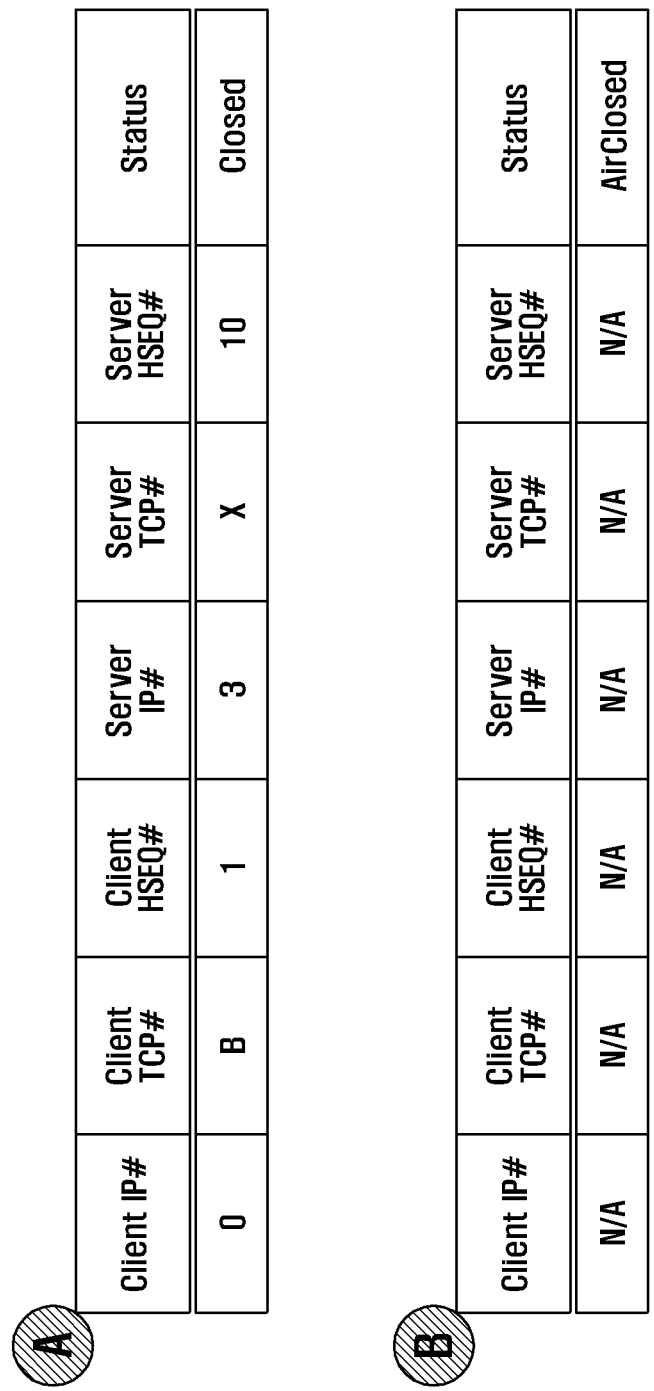
FIG. 9 is a diagram illustrating a management process of a database, which an HTTP proxy manages, with respect to the operation scenario of FIG. 8 according to an embodiment of the present invention.

FIG. 9 illustrates a management process of a database managed by an HTTP proxy with respect to the operation scenario of FIG. 8, according to an embodiment of the present invention.

Referring to FIG. 9, a database management status of each of points A and B illustrated in FIG. 8 are described as follows.

First, as illustrated in FIG. 9, in step A, the database stores session information regarding communications between the HTTP client 810 and the HTTP server 840.

However, when a wireless connection of the wireless UE is terminated, all IP protocol information of the corresponding wireless UE is deleted, all related TCP connection information is also deleted, and all information is then deleted, in step B.

FIG. 10 illustrates an expanded structure of the database of FIG. 6 according to an embodiment of the present invention.

The database of FIG. 10 is similar to the database illustrated in FIG. 6, except that a User Equipment (UE) IDentifier (ID) field is added. The UE ID field uses an identifier (e.g. a Media Access Control (MAC) address, an International Machine Equipment Identifier (IMEI), etc.) that can identify the UE in a wireless communications network.

Figure 11:
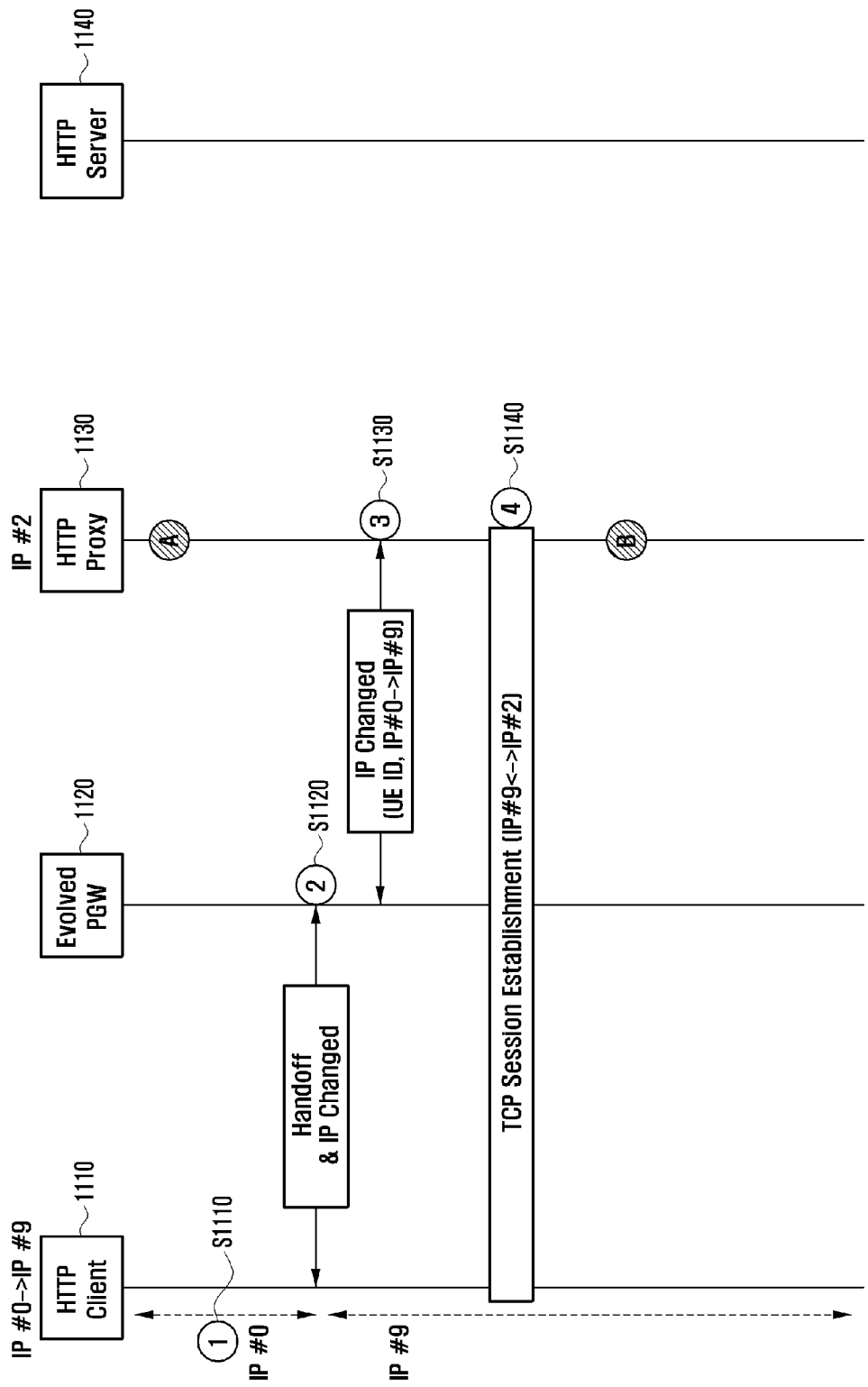
FIG. 11 is a signal flow diagram illustrating an operation scenario at a time of operating an idle handover with respect to a handover according to movement of a wireless UE according to an embodiment of the present invention.

FIG. 11 is a signal flow diagram illustrating an operation scenario at a time of operating an idle handover with respect to a handover according to movement of a wireless UE according to an embodiment of the present invention.

Referring to FIG. 11, first, in step S1110, an HTTP client 1110 performs HTTP communication by using IP#0.

Thereafter, in step S1120, the UE, within which the HTTP client 1110 is installed, changes a location thereof so that an IP address of the UE is changed. At this time, a new IP#9 is used instead of the previous IP#0.

Thereafter, in step S1130, the PGW 1120 transmits, to an HTTP proxy 1130, information indicating whether an IP address of the corresponding UE is changed. At this time, the HTTP proxy 1130 updates the IP address information of the corresponding UE at an HTTP session management table thereof.

Further, in step S1140, the HTTP proxy 1130 sets a new TCP session between the HTTP proxy 1130 and the HTTP client 1110. At this time, the HTTP proxy 1130 prevents an HTTP server 1140 from identifying the change in the IP information of the UE, by using the set information and the previous information.

FIG. 12 illustrates an example of a session database of an HTTP proxy 1130 with respect to the operation scenario of FIG. 11 according to an embodiment of the present invention.

With reference to FIG. 12, a database management status of each of points A and B illustrated in FIG. 11 are described as follows.

Referring to FIG. 12, first, in step A, the HTTP client 1110 has a UE ID of 0x1004 and an IP address of #0. Further, the HTTP client 1110 and the HTTP proxy 11130 have a TCP number of #B.

Thereafter, when the HTTP client 1110 performs a handover, the IP address of the HTTP client 1110 is changed to #9, and the TCP number between the HTTP client 1110 and the HTTP proxy 1130 is changed to #C, in step B. However, the HTTP server 1140 may not identify the handover, and thus information on the HTTP server 1140 is not changed.

Figure 13:
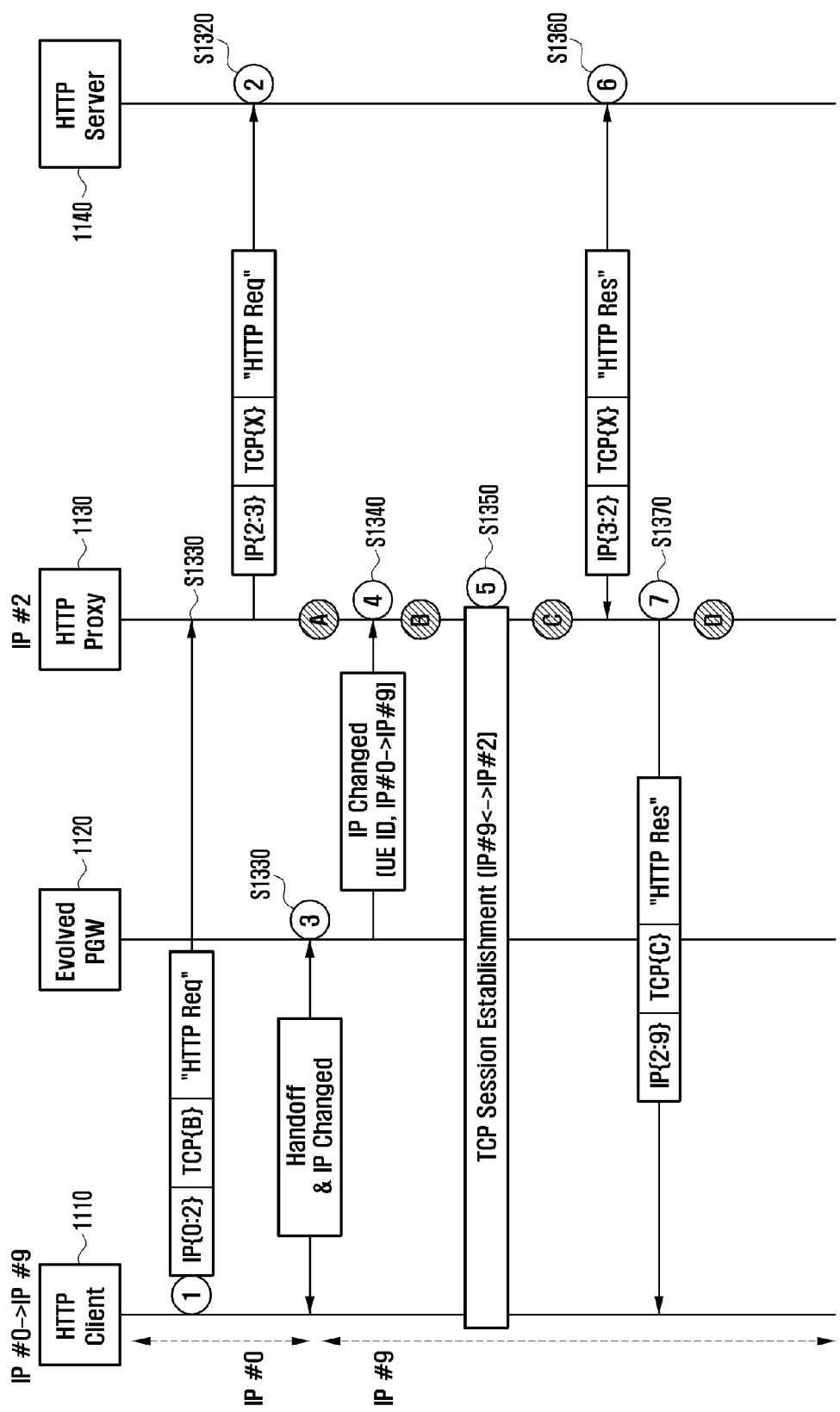
FIG. 13 is a signal flow diagram illustrating a first operation scenario at a time of operating a handover during a session with respect to a handover according to movement of a wireless UE according to an embodiment of the present invention.

FIG. 13 is a signal flow diagram illustrating a first operation scenario at a time of operating a handover during a session with respect to a handover according to movement of a wireless UE according to an embodiment of the present invention.

Referring to FIG. 13, in step S1310, the HTTP client 1110 uses IP#0 to transmit an HTTP request to the HTTP proxy 1130. Thereafter, in step S1320, the HTTP proxy 1130 transmits the HTTP request that has been received from the HTTP client 1110 to the HTTP server 1140. Thereafter, in step S1330, the UE, within which the HTTP client 1110 is installed, changes a location thereof so that IP address of the UE is changed. At this time, a new IP#9 is used instead of the previous IP#0.

Thereafter, in step S1340, the PGW 1120 transmits information indicating whether IP address of the corresponding UE is changed to an HTTP proxy 1130. At this time, the HTTP proxy 1130 updates the IP address information of the mobile UE at an HTTP session management table thereof.

Thereafter, in step S1350, the HTTP proxy 1130 sets a new TCP session between the HTTP client 1110 and the HTTP proxy 1130. At this time, the HTTP proxy 1130 prevents the HTTP server 1140 in a state from knowing about the change in the IP information of the UE by using the information of step S1340.

Thereafter, in step S1360, an HTTP response to the HTTP request of step S1320 arrives at the HTTP proxy 1130, from the HTTP server 1140. Thereafter, in step S1370, the HTTP proxy 1130 transmits the response to the HTTP client 1110, based on the new TCP connection of step S1350.

Figure 14:
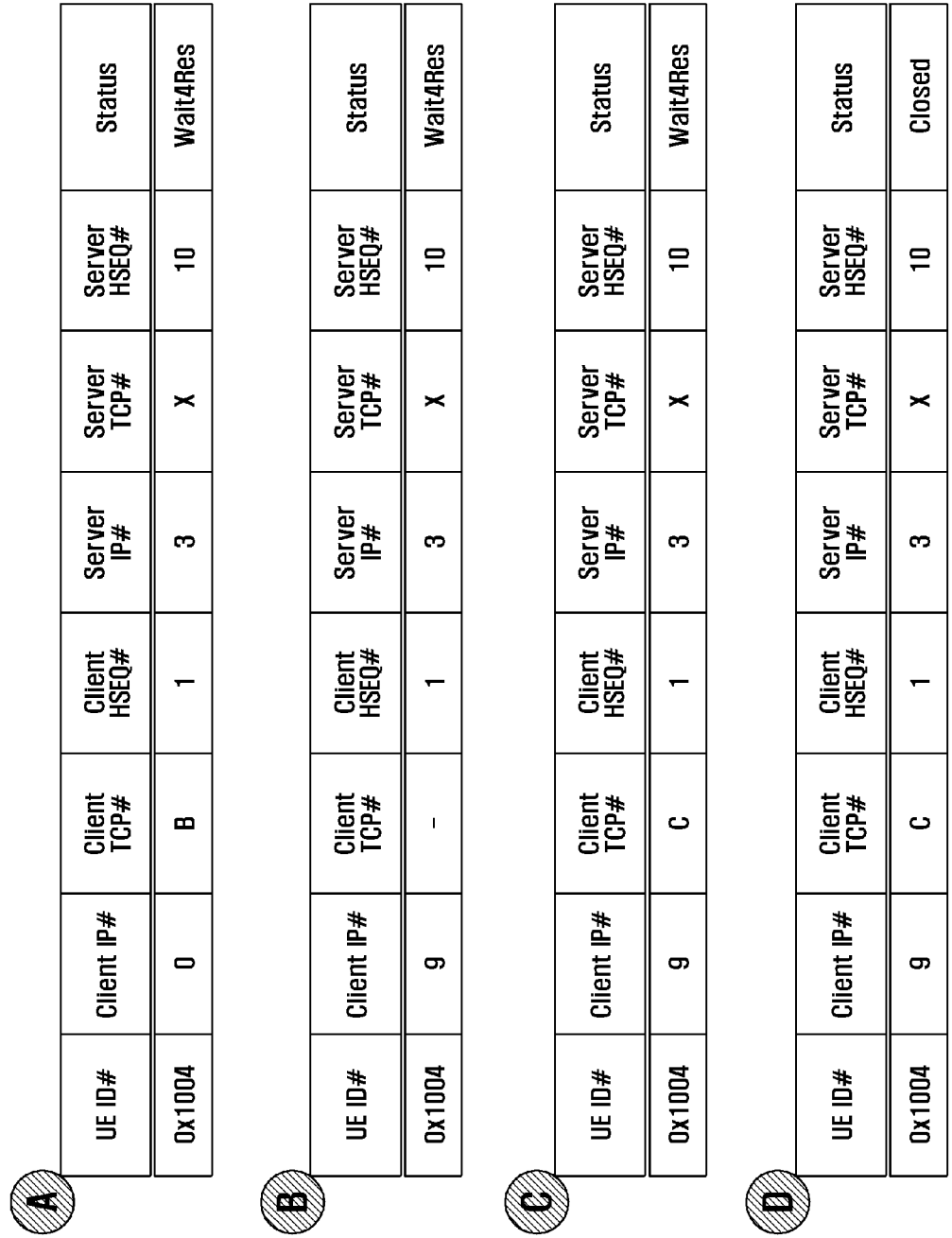
FIG. 14 is a diagram illustrating an example of management of a session database of an HTTP proxy with respect to the operation scenario of FIG. 13 according to an embodiment of the present invention.

FIG. 14 illustrates an example of managing a session database of an HTTP proxy with respect to the operation scenario of FIG. 13 according to an embodiment of the present invention.

With reference to FIG. 14, a database management status of each of points A, B, C, and D illustrated in FIG. 13 is described as follows.

Referring to FIG. 14, first, in step A, the HTTP client 1110 uses an IP address of #0 and a TCP connection of #B with respect to communications between the HTTP client 1110 and the HTTP proxy 1130.

In step B, the IP address of the HTTP client 1110 is changed to #9, but the TCP connection between the HTTP client 1110 and the HTTP proxy 1130 is blank, since the TCP connection is has not been set yet.

In step C, the TCP connection between the HTTP client 1110 and the HTTP proxy 1130 is newly set so that a TCP number in the database is changed to #C. More specifically, in steps A, B, and C, an HTTP request is transmitted to the HTTP server 1140, but since an HTTP response to the HTTP request does not arrive, the status is maintained at "Wait4Res".

In step D, the HTTP response is received at the HTTP server 1140 and is transmitted to the HTTP client 1110, and the status is then changed to "Closed".

Figure 15:
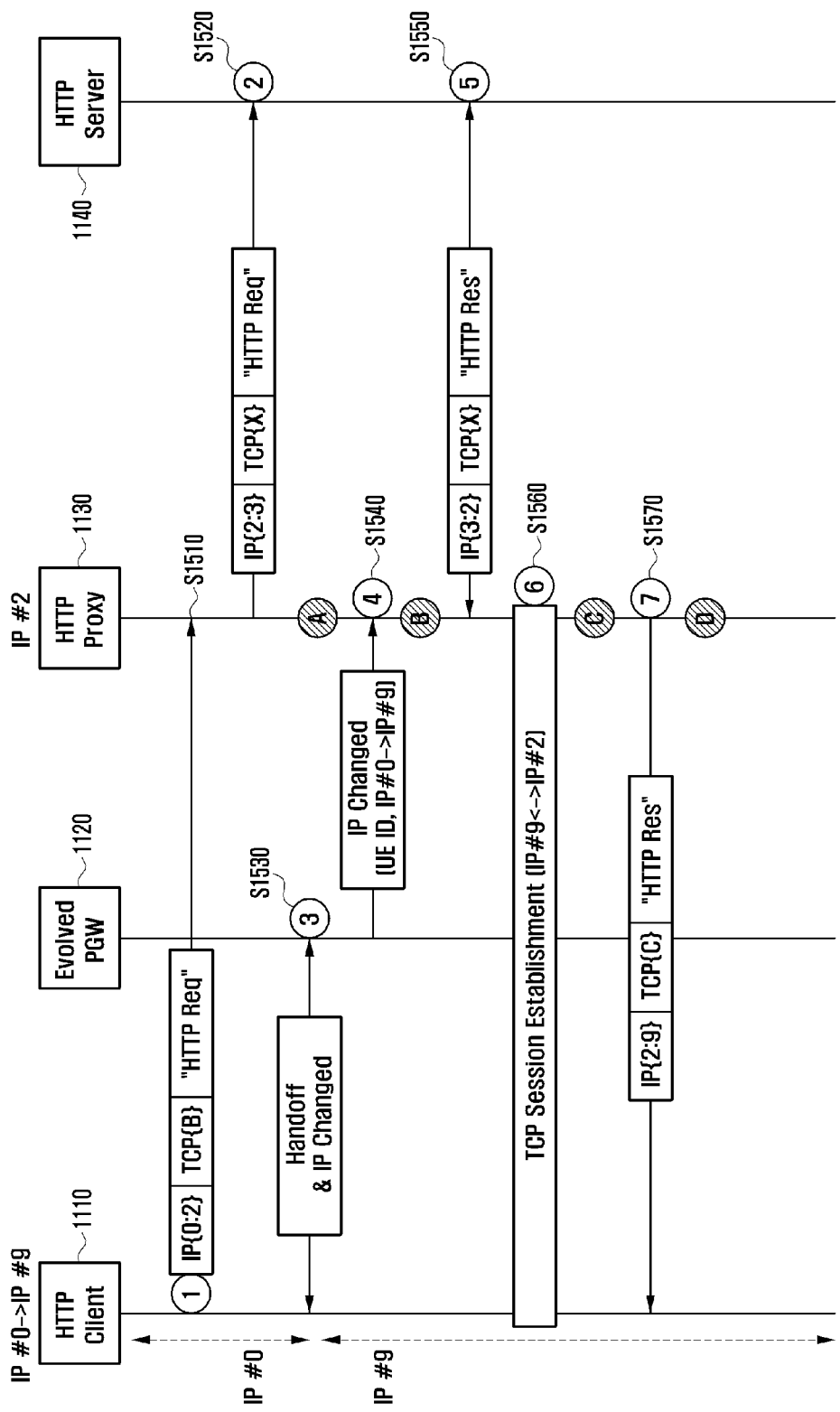
FIG. 15 is a signal flow diagram illustrating a second operation scenario at a time of operating a handover during a session with respect to a handover according to movement of a wireless UE according to an embodiment of the present invention.

FIG. 15 is a signal flow diagram illustrating a second operation scenario at a time of operating a handover during a session with respect to a handover according to movement of a wireless UE according to an embodiment of the present invention.

Referring to FIG. 15, first, in step S1510, the HTTP client 1110 uses IP#0 to transmit an HTTP request to the HTTP proxy 1130. Thereafter, in step S1520, the HTTP proxy 1130 transmits the HTTP request that has been received from the HTTP client 1110 to the HTTP server 1140.

Thereafter, in step S1530, the UE, within which the HTTP client 1110 is installed, changes a location thereof, so that an IP address of the UE is changed. At this time, a new IP#9 is used instead of the previous IP#0. Thereafter, in step S1540, the PGW 1120 transmits information indicating whether an IP address of the corresponding UE is changed to an HTTP proxy 1130. At this time, the HTTP proxy 1130 updates the IP address information of the mobile UE at an HTTP session management table thereof.

Meanwhile, in step S1550, an HTTP response to the HTTP request of step S1520 arrives at the HTTP proxy 1130 from the HTTP server 1140 and is then stored as a standby status.

Thereafter, in step S1560, the HTTP proxy 1130 sets a new TCP session between the HTTP client 1110 and the HTTP proxy 1130. At this time, the HTTP proxy 1130 prevents the HTTP server 1140 from knowing about the change in the IP information of the UE by using the information of step 1540.

Thereafter, in step 1570, the HTTP proxy 1130 transmits the response of step S1550 to the HTTP client 1110 based on the newly-set TCP connection.

FIG. 16 illustrates an example of managing a session database of an HTTP proxy 1130 with respect to the operation scenario of FIG. 15 according to an embodiment of the present invention.

With reference to FIG. 16, a database management status of each of points A, B, C, and D illustrated in FIG. 15 is described as follows.

Referring to FIG. 16, first, in step A, the HTTP client 1110 uses an IP address of #0 and a TCP connection of #B with respect to communications between the HTTP client 1110 and the HTTP proxy 1130.

In step B, the IP address of the HTTP client 1110 is changed to #9, but the TCP connection between the HTTP client 1110 and the HTTP proxy 1130 is blank, since the TCP connection has not been set yet.

In step C, the TCP connection between the HTTP client 1110 and the HTTP proxy 1130 is identified as newly set TCP connection, so that a TCP number in the database is changed to #C. In particular, in steps A and B, an HTTP request is transmitted to the HTTP server 1140, but since an HTTP response to the HTTP request does not arrive, the status is maintained at "Wait4Res".

In step C, although the HTTP response arrives, the TCP connection has not been set between the HTTP client 1110 and the HTTP proxy 1130, so that the HTTP response is stored in the HTTP proxy 1130. Thus, the status of the HTTP session is changed to "ResQueued".

In step D, the HTTP response is received at the HTTP server 1140 and is transmitted to the HTTP client 1110, and the status is then changed to "Closed".

Figure 17:
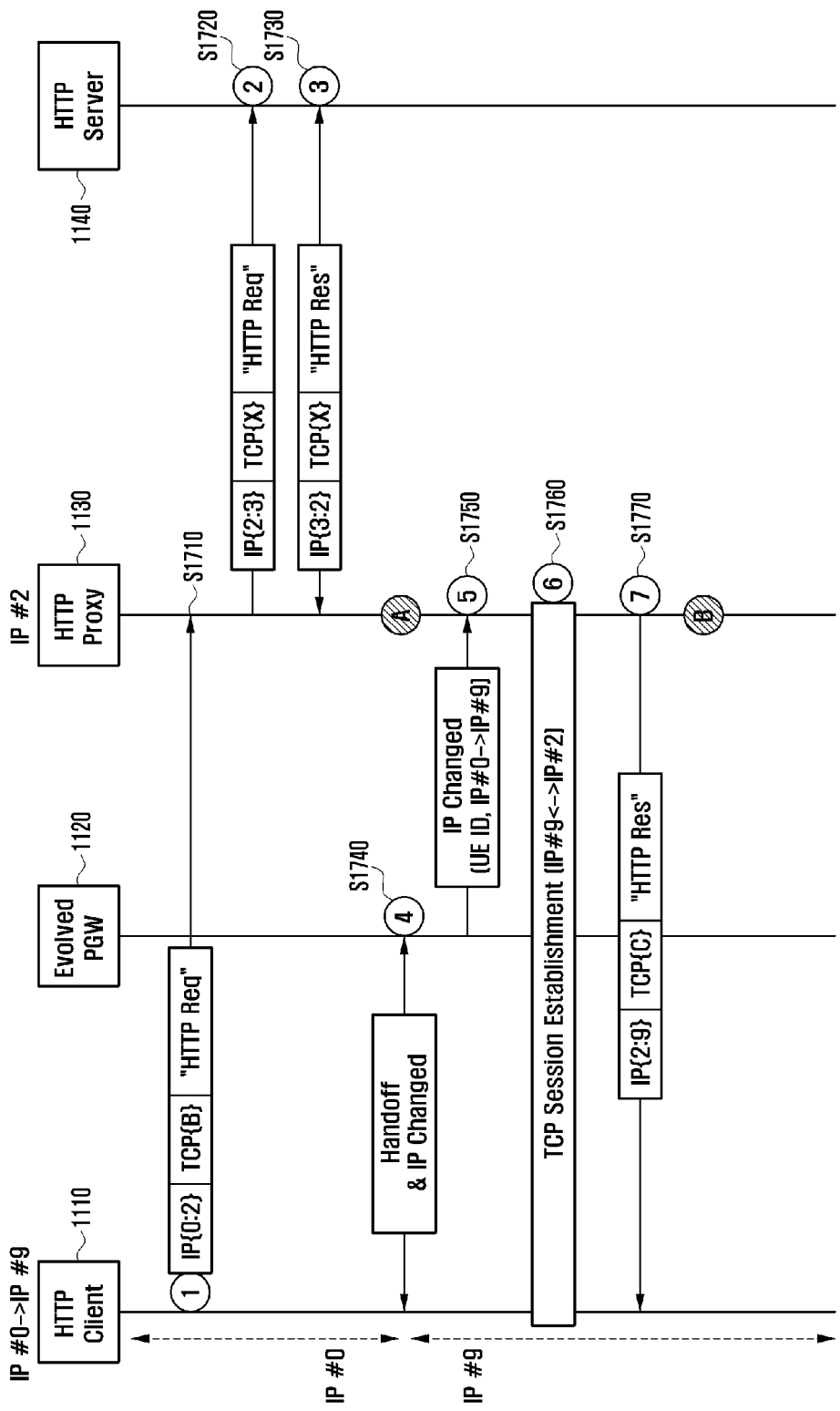
FIG. 17 is a signal flow diagram illustrating a third operation scenario at a time of operating a handover during a session with respect to a handover according to movement of a wireless UE according to an embodiment of the present invention.

FIG. 17 is a signal flow diagram illustrating a third operation scenario at a time of operating a handover during a session with respect to a handover according to movement of a wireless UE according to an embodiment of the present invention.

Referring to FIG. 17, in step S1710, the HTTP client 1110 uses IP#0 to transmit an HTTP request to the HTTP proxy 1130. Thereafter, in step S1720, the HTTP proxy 1130 transmits the HTTP request that has been received from the HTTP client 1110 to the HTTP server 1140.

Thereafter, in step S1730, an HTTP response to the HTTP request of step S1720 arrives at the HTTP proxy 1130 from the HTTP server 1140 and is then stored according to a transmission standby status.

Thereafter, in step S1740, the UE, within which the HTTP client 1110 is installed, changes a location thereof so that an IP address of the UE is changed. At this time, a new IP#9 is used instead of the previous IP#0.

Thereafter, in step S1750, the PGW 1120 transmits information indicating whether an IP address of the corresponding UE is changed to an HTTP proxy 1130. At this time, the HTTP proxy 1130 updates the IP address information of the mobile UE at an HTTP session management table thereof.

Thereafter, in step S1760, the HTTP proxy 1130 newly sets a TCP session between the HTTP client 1110 and the HTTP proxy 1130. At this time, the HTTP proxy 1130 prevents the HTTP server 1140 from knowing about the change in the IP information of the UE by using the information of step 1750.

Thereafter, the response of step S1730 is transmitted to the HTTP client 1110 based on the newly-set TCP connection, in step 1770.

FIG. 18 illustrates an example of managing a session database of an HTTP proxy 1130 with respect to the operation scenario of FIG. 17 according to an embodiment of the present invention.

With reference to FIG. 18, a database management status of each of points A and B illustrated in FIG. 17 is described as follows.

Referring to FIG. 18, first, in step A, the HTTP client 1110 uses an IP address of #0 and a TCP connection of #B with respect to communications between the HTTP client 1110 and the HTTP proxy 1130.

In step B, the HTTP response is received from the HTTP server 1140 and is transmitted to the HTTP client 1110, and the status is then changed to "Closed". The IP address of the HTTP client 1110 is also changed to #9, and the TCP number is changed to #C.

Figure 19:
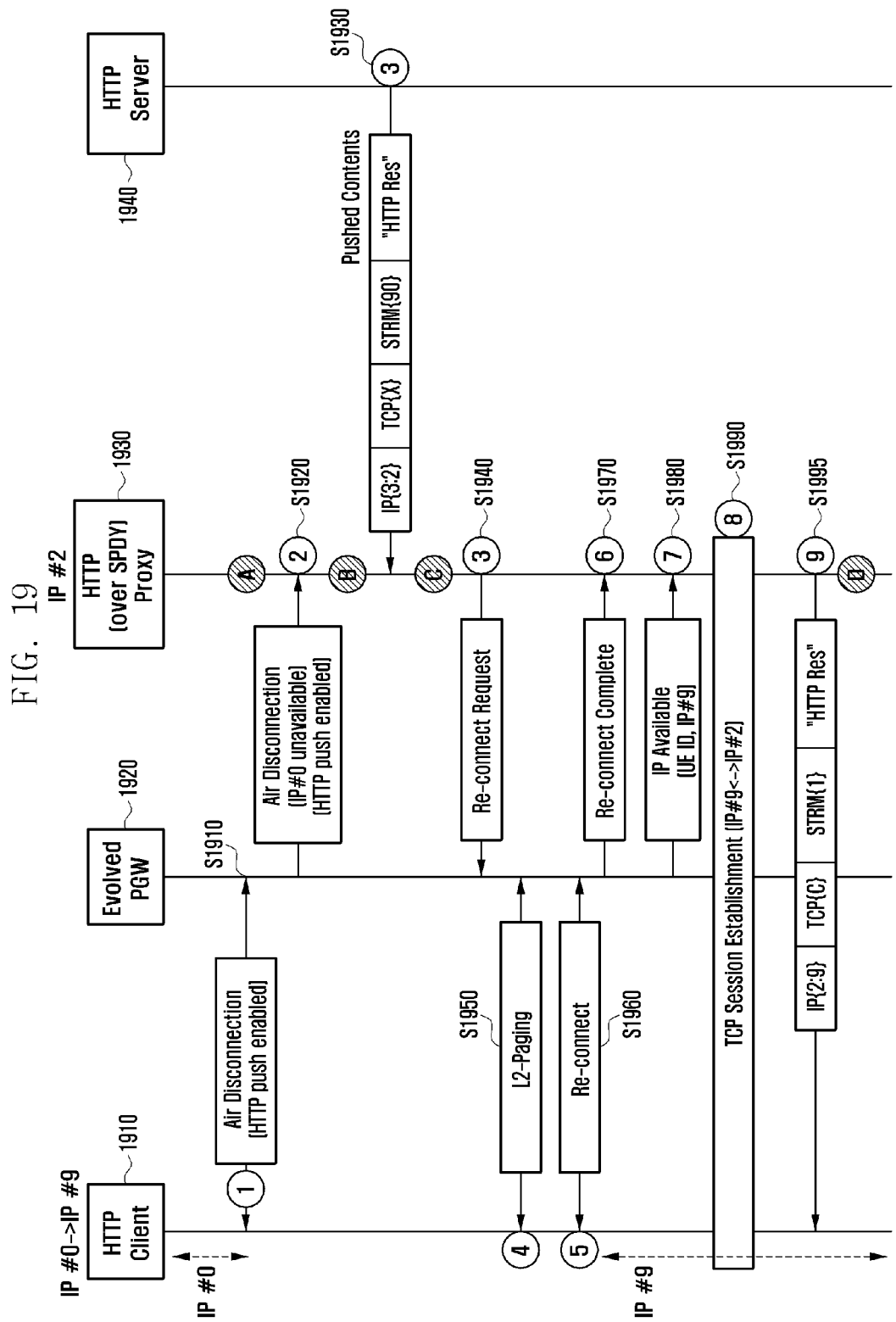
FIG. 19 is a signal flow diagram illustrating an operation scenario of an HTTP push service for an idle UE according to an embodiment of the present invention.

FIG. 19 is a signal flow diagram illustrating an operation scenario of an HTTP push service for an idle UE according to an embodiment of the present invention.

Referring to FIG. 19, first, in step S1910, an HTTP client 1910 returns an IP address to an evolved PGW 1920, while deactivating a wireless channel of a UE being driven. However, the HTTP client 1910 (or the HTTP server 1940) has previously requested support for an HTTP push, or requests support for the HTTP push at a time of connection deactivation.

Thereafter, in step S1920, the HTTP proxy 1930 receives the HTTP push service support request from a PGW 1920 and stores the request as status information. At this time, the HTTP proxy 1930 and the HTTP server 1940 use a SPDY protocol.

Thereafter, in step S1930, the HTTP server 1940 transmits an HTTP push transmission request for a UE that does not have an IP, to the HTTP proxy 1930. Thereafter, in step S1940, the HTTP proxy 1930 sends, to the PGW 1920, a request to perform UE paging and to find a UE by using a UE ID of the UE stored in step S1920.

Thereafter, in step S1950, the HTTP proxy 1930 transmits a message transmitted from the HTTP server 1940 to the HTTP client 1910.

Thereafter, a process in which a UE acquires a new IP#9 and a new TCP connection #C again through wireless paging by using a paging procedure of a mobile communication system according to the related art is illustrated in steps S1960 to S1990. To avoid obscuring the subject matter of the present invention, a further detailed description of steps S1960 to S1990 is omitted herein.

Thereafter, in step S1995, the HTTP proxy 1930 transmits a message transmitted from the HTTP server 1940 to the HTTP client 1910.

FIG. 20 illustrates an example of managing a session database of an HTTP proxy with respect to the operation scenario of FIG. 19 according to an embodiment of the present invention.

Referring to FIG. 20, first, in step A, since a mobile UE, which the HTTP client 1910 operates, performs communication normally, all fields of the database are filled.

However, in step B, the mobile UE deactivates its own wireless connection, so that all the fields of the HTTP client 1910 side become blank. However, since the HTTP client 1910 transmits an HTTP push request to the HTTP proxy 1930 while deactivating wireless connection, the HTTP proxy 1930 maintains communication with the HTTP server 1940. Simultaneously, the HTTP proxy 1930 does not remove HTTP server information and changes the status of the corresponding HTTP session to "PushEnable".

In step C, the mobile UE receives the HTTP push while the wireless connection and IP communication of the corresponding UE are deactivated. At this time, the status of the session is changed to "Wait4Push".

In step D, the wireless connection is newly restored for the HTTP push, and thus it is noted that all information of the HTTP client 1910 is updated to new information again.

While the invention has been shown and described with reference to certain embodiments thereof, it will be understood by those skilled in the art that various changes in form and detail may be made therein without departing form the spirit and scope of the invention as defined by the appended claims and their equivalents.

What is claimed is:

1. A method by a hypertext transfer protocol (HTTP) proxy device in a wireless communication network, the method comprising:
    receiving a first request message including a first sequence number determined based on a transmission sequence of the first request message, from an HTTP client;
    determining a second sequence number based on the first sequence number;
    transmitting a second request message including the second sequence number to an HTTP server;
    receiving a first response message including the second sequence number from the HTTP server;
    identifying the second sequence number included in the first response message;
    determining the first sequence number corresponding to the second sequence number; and
    transmitting a second response message according to a sequence of reception of the first response message to the HTTP client, the second response message including the first sequence number.

2. The method of claim 1, further comprising deactivating a transmission control protocol (TCP) connection with the HTTP server used by the HTTP client when the HTTP proxy device receives the first request message including information indicating the wireless connection deactivation of the HTTP client.

3. The method of claim 1, further comprising updating, when the HTTP proxy device receives the first request message including information indicating a change in an IP address of the HTTP client, IP address information of the HTTP client at an HTTP session management table; and
    setting a new TCP connection with the HTTP client.

4. The method of claim 3, further comprising:
    receiving a message to be transmitted to the HTTP client, by the HTTP server; and
    transmitting the message received from the HTTP server to the HTTP client based on the newly-set TCP connection.

5. The method of claim 3, wherein the information indicating a change in an IP address of the HTTP client is not transmitted to the HTTP server.

6. The method of claim 1, further comprising receiving an HTTP push service support request from the HTTP client when the HTTP proxy device receives the first request message including information indicating the wireless connection deactivation of the HTTP client.

7. The method of claim 6, further comprising:
    receiving an HTTP push transmission request for an HTTP client that does not have an IP address, from the HTTP server; and
    requesting a predetermined node to perform paging for the HTTP client, and setting a new IP address and TCP connection for the HTTP client.

8. The method of claim 7, wherein the predetermined node is a packet data network gateway (PGW).

9. The method of claim 6, further comprising maintaining a connection with the HTTP server when deactivating the wireless connection with the HTTP client.

10. A hypertext transmission protocol (HTTP) proxy device in a wireless communication network, the HTTP proxy device comprising:
    an interface unit that performs communication with a predetermined node located at the wireless communication network; and
    a controller configured to:
        receive a first request message including a first sequence number determined based on a transmission sequence of the first request message, from an HTTP client,
        determine a second sequence number based on the first sequence number,
        transmit a second request message including the second sequence number to an HTTP server,
        receive a first response message including the second sequence number from the HTTP server,
        identify the second sequence number included in the first response message,
        determine the first sequence number corresponding to the second sequence number, and
        transmit a second response message according to a sequence of reception of the first response message to the HTTP client, the second response message including the first sequence number.

11. The HTTP proxy device of claim 10, wherein the controller is further configured to deactivate a transmission control protocol (TCP) connection with the HTTP server which the HTTP client has used when the HTTP proxy device receives the first request message including information indicating the wireless connection deactivation of the HTTP client.

12. The HTTP proxy device of claim 10, wherein the controller is further configured to update IP address information of the HTTP client at an HTTP session management table, and to set new TCP connection with the HTTP client, when the HTTP proxy device receives the first request message including information indicating a change in an IP address of the HTTP client.

13. The HTTP proxy device of claim 12, wherein the controller is further configured to control transmission of a message received from the HTTP server to the HTTP client based on the newly-set TCP connection when the HTTP server receives the message to be transmitted to the HTTP client.

14. The HTTP proxy device of claim 12, wherein the controller is further configured to prevent transmission of the information indicating a change in an IP address of the HTTP client to the HTTP server.

15. The HTTP proxy device of claim 10, wherein the controller is further configured to receive an HTTP push service support request from the HTTP client when the HTTP proxy device receives the first request message including information indicating the wireless connection deactivation of the HTTP client.

16. The HTTP proxy device of claim 15, wherein the controller is further configured to request the predetermined node to perform paging for the HTTP client, and set a new IP address and TCP connection for the HTTP client, when receiving an HTTP push transmission request for an HTTP client not having an IP address, from the HTTP server.

17. The HTTP proxy device of claim 15, wherein the controller is further configured to control maintenance of a connection with the HTTP server when deactivating wireless connection with the HTTP client.

18. The HTTP proxy device of claim 10, wherein the predetermined node is a packet data network gateway (PGW).

* * * * *